United States Patent
Matsuoka et al.

[19]

[11] Patent Number: 6,045,394
[45] Date of Patent: *Apr. 4, 2000

[54] ELECTRICAL CONNECTION BOX ASSEMBLY WITH TAPERED PROJECTION

[75] Inventors: Hideo Matsuoka; Toshihisa Sekido, both of Yokkaichi, Japan

[73] Assignee: Sumitomo Wiring Systems, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/036,383

[22] Filed: Mar. 6, 1998

[30] Foreign Application Priority Data

Mar. 11, 1997 [JP] Japan ................................... 9-056412

[51] Int. Cl.[7] ................................................ H01R 13/58

[52] U.S. Cl. ........................................... 439/464; 439/473

[58] Field of Search ..................................... 439/464, 465, 439/466, 211, 470, 471, 472, 473; 174/135, 138 F, 71 R, 72 R, 72 A

[56] References Cited

U.S. PATENT DOCUMENTS

| | | | |
|---|---|---|---|
| 4,564,255 | 1/1986 | Kirma | 339/103 R |
| 4,842,550 | 6/1989 | Fry, Jr. et al. | 439/471 |
| 5,074,805 | 12/1991 | Kirma . | |
| 5,315,062 | 5/1994 | Hoshino | 174/52.1 |
| 5,620,334 | 4/1997 | Quillet et al. . | |

FOREIGN PATENT DOCUMENTS 493423  8/1992  Japan .

*Primary Examiner*—Lincoln Donovan
*Attorney, Agent, or Firm*—Jordan B. Bierman; Bierman, Muserlian and Lucas

[57] ABSTRACT

An electrical connection box assembly which is provided with a projection extending outwardly of the body and located on the front wall at an angle thereto. The projection tapers from its proximal end adjacent the front wall toward the distal end remote therefrom. Thus, after the wire harness is placed in the projection, a tie strap is tightened therearound. The tapered configuration of the projection urges the tie strap toward the retaining element located adjacent the distal end. Thus, the wire harness can be reliably and securely fixed in its desired position.

7 Claims, 7 Drawing Sheets

ELECTRICAL CONNECTION BOX ASSEMBLY WITH TAPERED PROJECTION

This Application claims the benefit of the priority of Japanese Application 9-56412, filed Mar. 11, 1997.

The present Invention is directed to an electrical connection box, more specifically a construction which permits a wire harness emerging from the connection box to be securely held in its proper position.

BACKGROUND OF THE INVENTION

Electrical connection boxes of the type to which the present Invention is applicable are customarily mounted in automobiles to hold various electronic devices such as relays and fuses. In addition, boxes of this type also serve to encase branching points for such wire harnesses.

As shown in FIGS. 5, 6, and 7, electrical connection box 50 comprises cover 51 and body 52. The electronic devices (not shown) are retained therein. The box is advantageously formed by injection molding of a synthetic resin.

Projection 53, having a semi-circular groove 54, preferably extends diagonally downward at angle D from front wall 52A. At the distal end of projection 53 is flange 55, the surface of which is parallel to front wall 52A.

Cut out 52B is formed in front wall 52A and preferably is of the same width as the diameter of semi-circular groove 54 of projection 53. Moreover, it merges into groove 54 so that wire harness 57 can pass through cut out 52B into groove 54 smoothly. The diameter of groove 54 is designed also to match the diameter of wire harness 57 and is the same from the proximal to the distal ends.

Tie strap 57A is wrapped around projection 53 in order to secure wire harness 57 therein. However, a problem arises as to the orientation of the strap. Specifically, the strap would be most secure if it were attached as shown in FIG. 7; i.e. the longitudinal axis of the strap is perpendicular to the axis of projection 53. However, since these connection boxes are installed under the hoods of automobiles, the amount of space is quite limited. Therefore, it is easier to pull tie strap 56 straight up as shown in FIG. 6. If this is done, gaps 53A and 57A are formed between the strap and the projection.

Also, vibrations generated by movement of the automobile and the engine, tie strap 56 has a tendency to be displaced along the axis of projection 53. It is the purpose of the present Invention to eliminate this problem.

SUMMARY OF THE INVENTION

There is provided a connection box assembly comprising a generally rectangular body having a front wall, a cover on the body, and a projection extending outwardly of the body on the front wall. The projection comprises an open channel and tapers from its proximal end (adjacent the front wall) to its distal end (remote from the proximal end). The projection has an open channel in which the wire harness rests.

In a preferred form of the Invention, there is a retaining element, extending radially outwardly from the projection at or adjacent the distal end. It is further desirable to provide a tie strap on the projection, preferably located adjacent the aforementioned retaining element and located between the distal and proximal ends. Thus, when the tie strap is tightened, the taper of the projection urges it toward the distal end and against the retaining element. This effectively prevents or minimizes any shifting resulting from the operation of the automobile.

In one form of the Invention, the retaining element is a flange and, in another embodiment, the retaining element is a plurality of protuberances against which the tie strap is urged.

During the wiring of connection box 50, the position at which tie strap 56 is located fixes wire harness 57 and acts as a reference point in measuring the length of the various wires involved. Therefore, the degree of slack or tension in wire harness 57 is determined based upon the location of tie strap 56. If strap 56 moves, the wire will be slackened or tensioned depending on the direction of movement. This would require readjustments of the length of wire harness 57 either during or after the wiring and tightening operations. Clearly, if this must be done, it renders the entire installation more time-consuming, expensive, and less efficient. The present Invention solves these problems.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
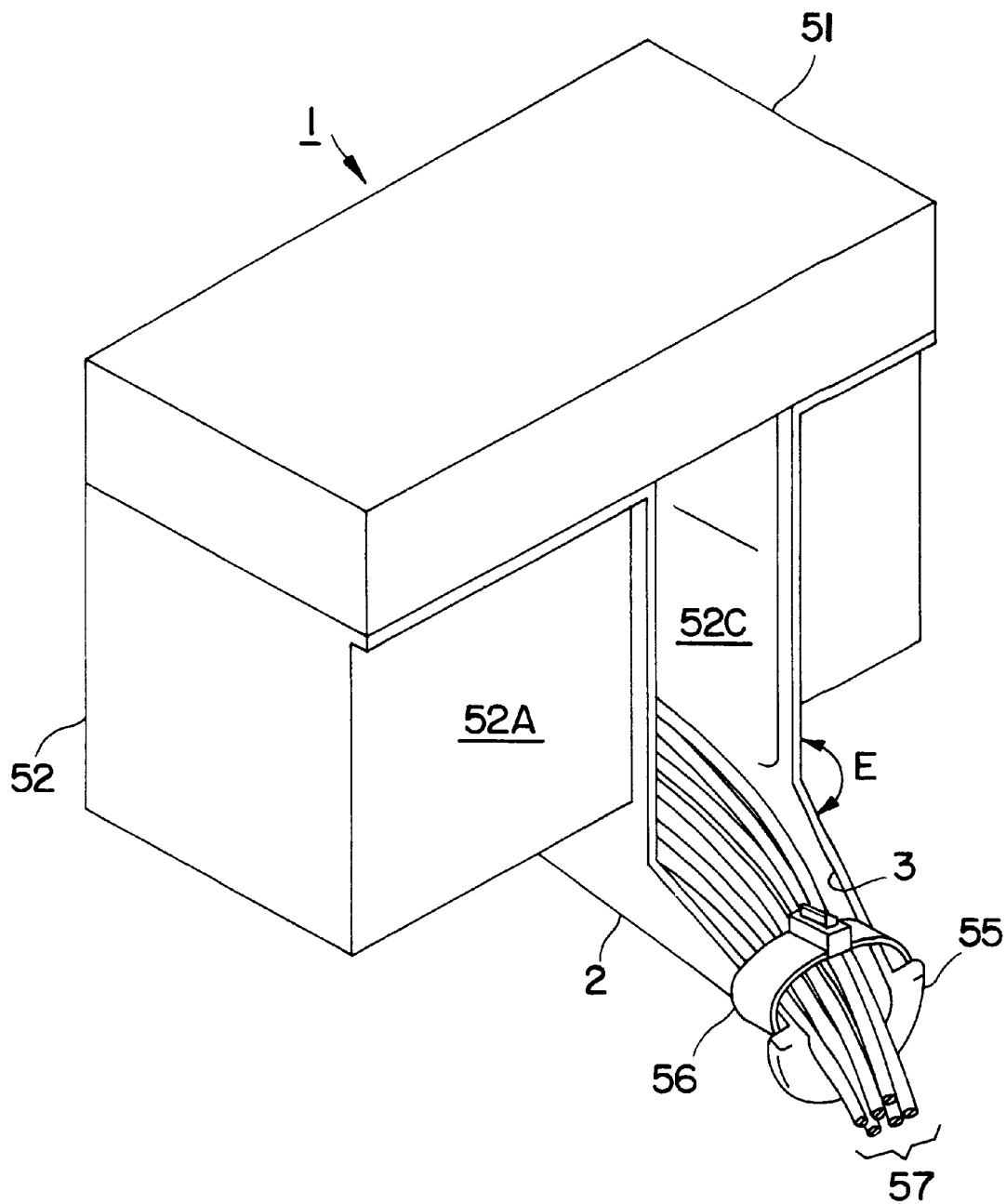
FIG. 1 is a perspective view of one embodiment of the present Invention.
Figure 2:
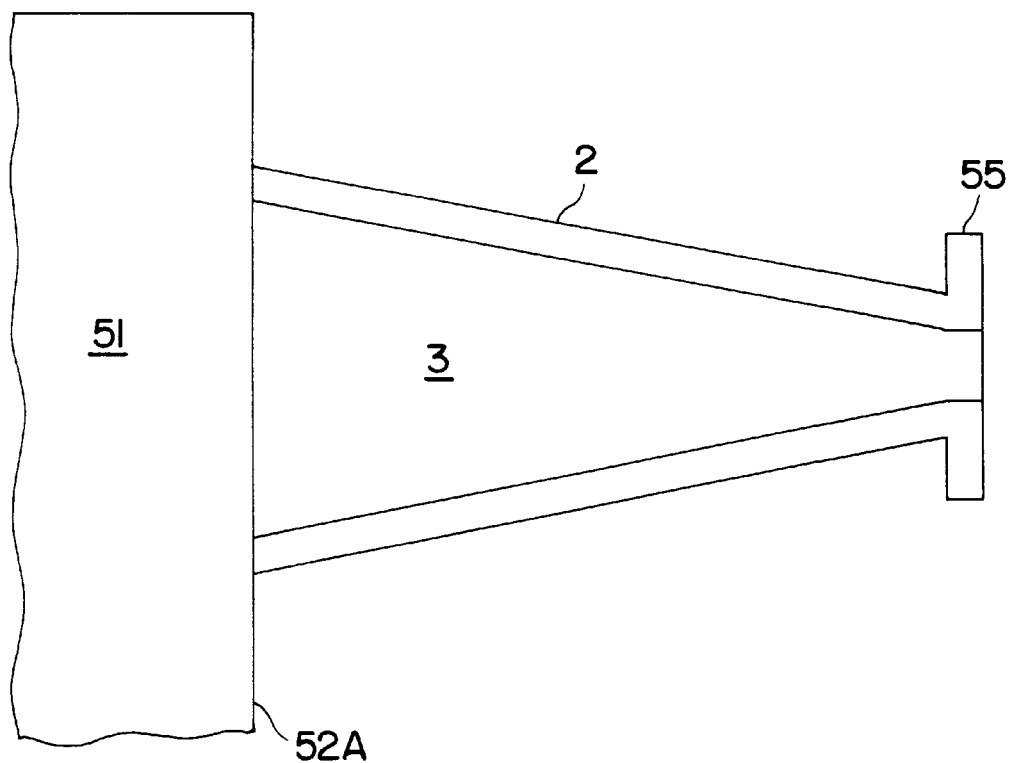
FIG. 2 is a fragmentary plan view of the Invention as shown in FIG. 1.
Figure 3:
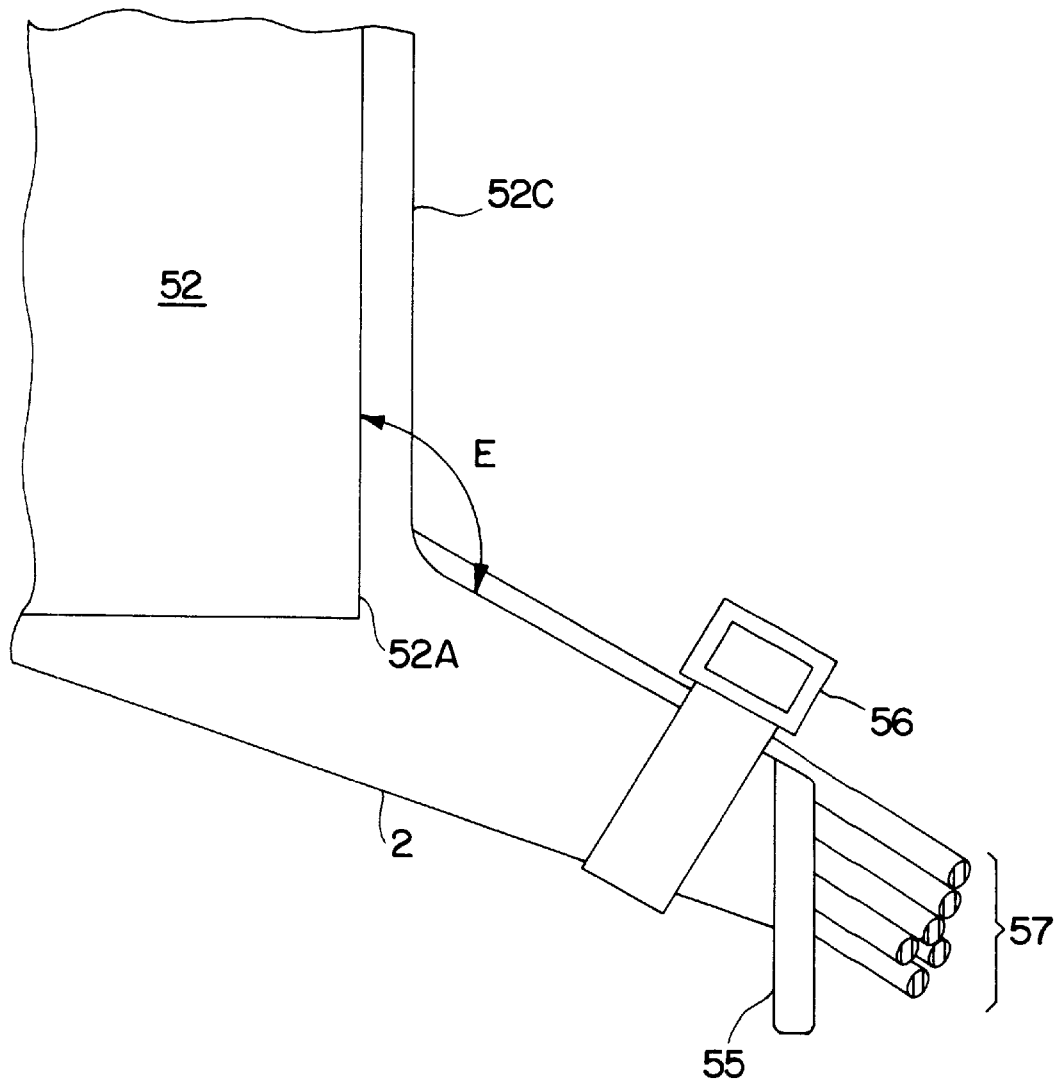
FIG. 3 is a schematic side view of the present Invention as shown in FIG. 1.

With reference to FIGS. 1 to 4, connection box 1 comprises body 52 and cover 51. Front wall 52A is provided with cut out 52C and tapered projection 2. The latter preferably descends from front wall 52A at angle E therewith. It is formed with tapered groove 3 for retaining wire harness 57. At the distal end thereof, flange 55 is provided. The diameter of groove 3 at flange 55 is predetermined to match that of wire harness 57. As can be seen particularly in FIG. 1, the taper of projection 2, when tie strap 56 is tightened, urges the tie strap against flange 55. This secures it in place and substantially prevents unwanted movement thereof.

Figure 4:
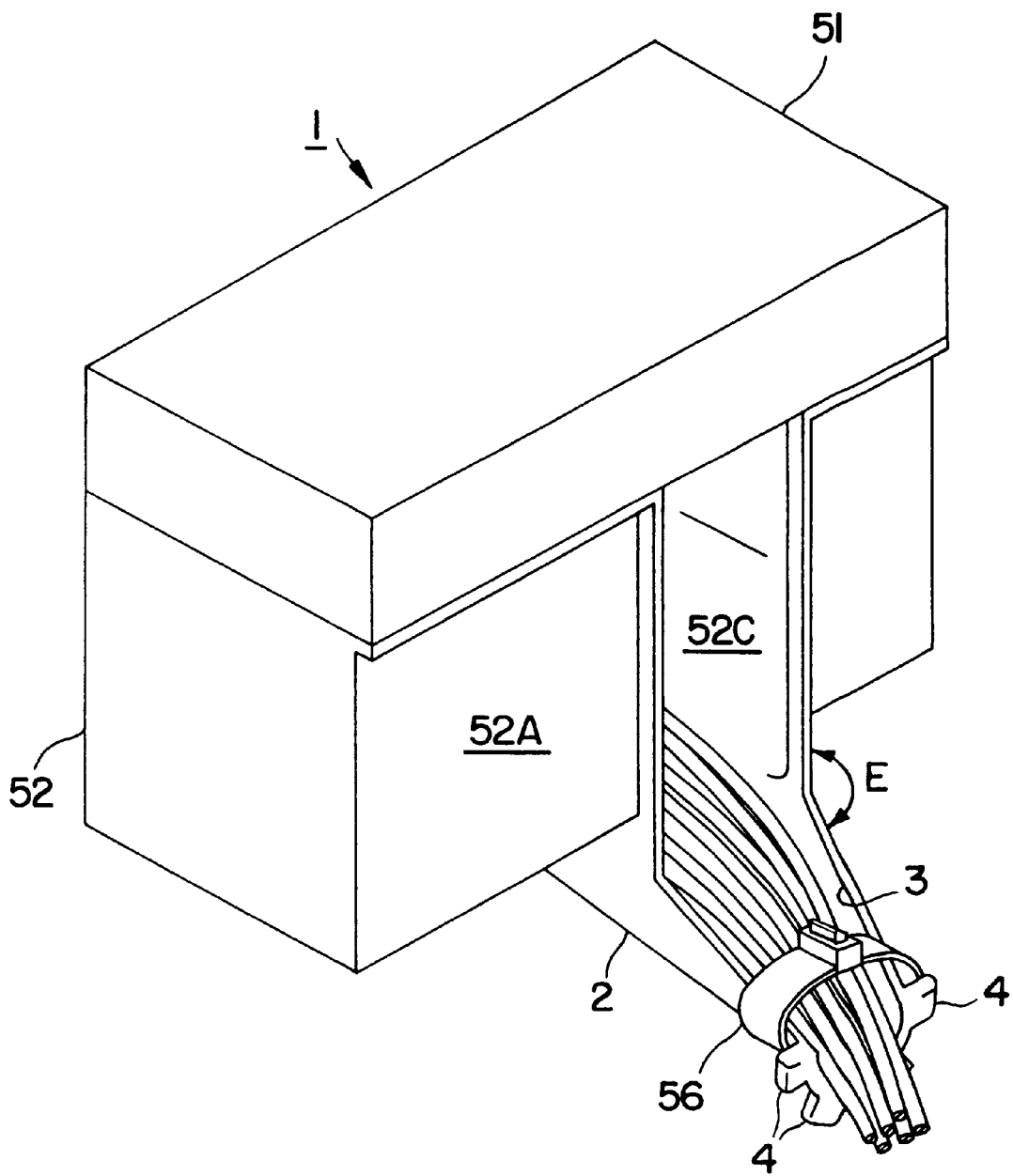
FIG. 4 is a view, similar to that of FIG. 1, of a second embodiment of the present Invention.
Figure 5:
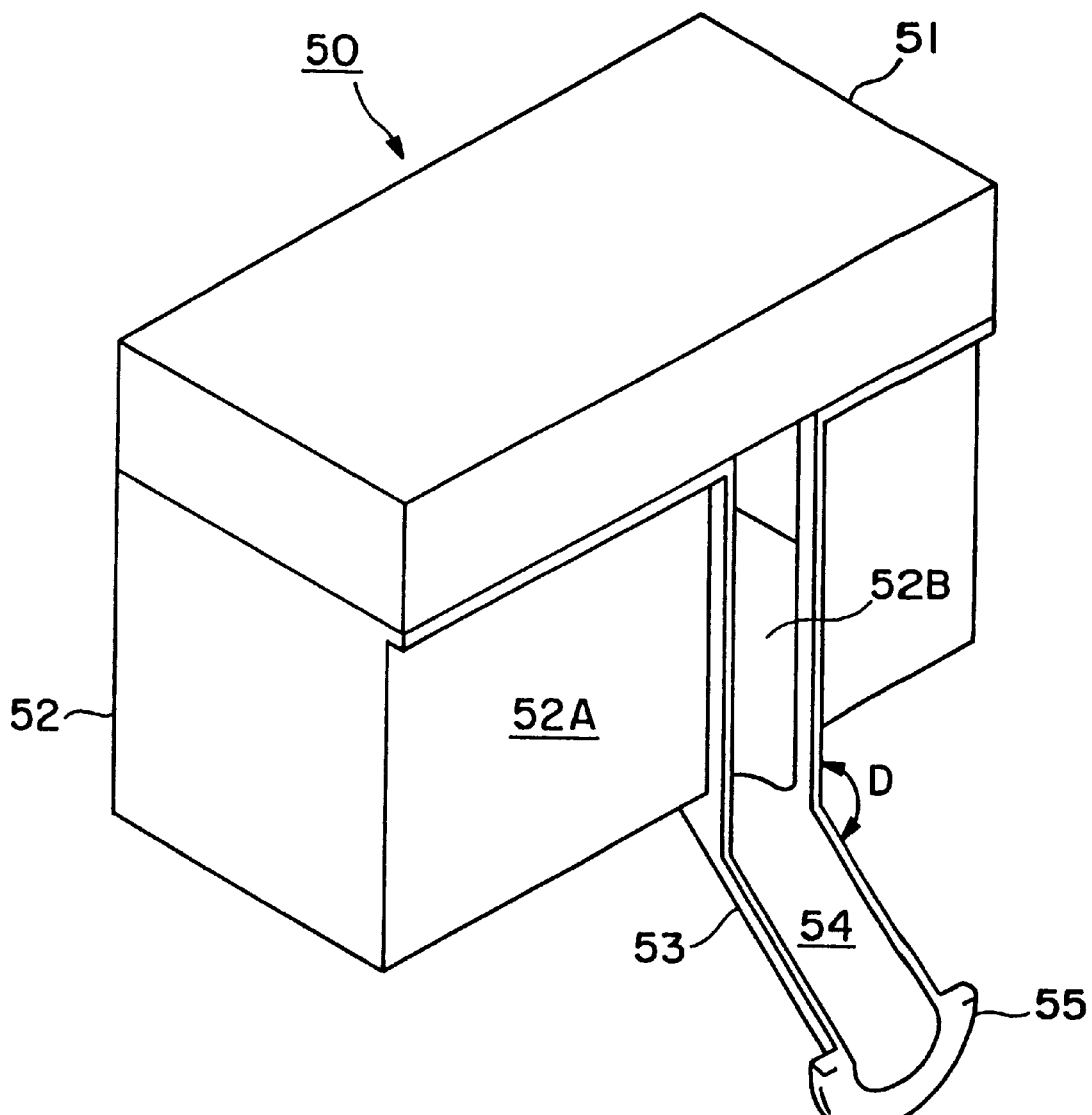
FIG. 5 is a view, similar to that of FIG. 1, showing a prior art connection box.
Figure 6:
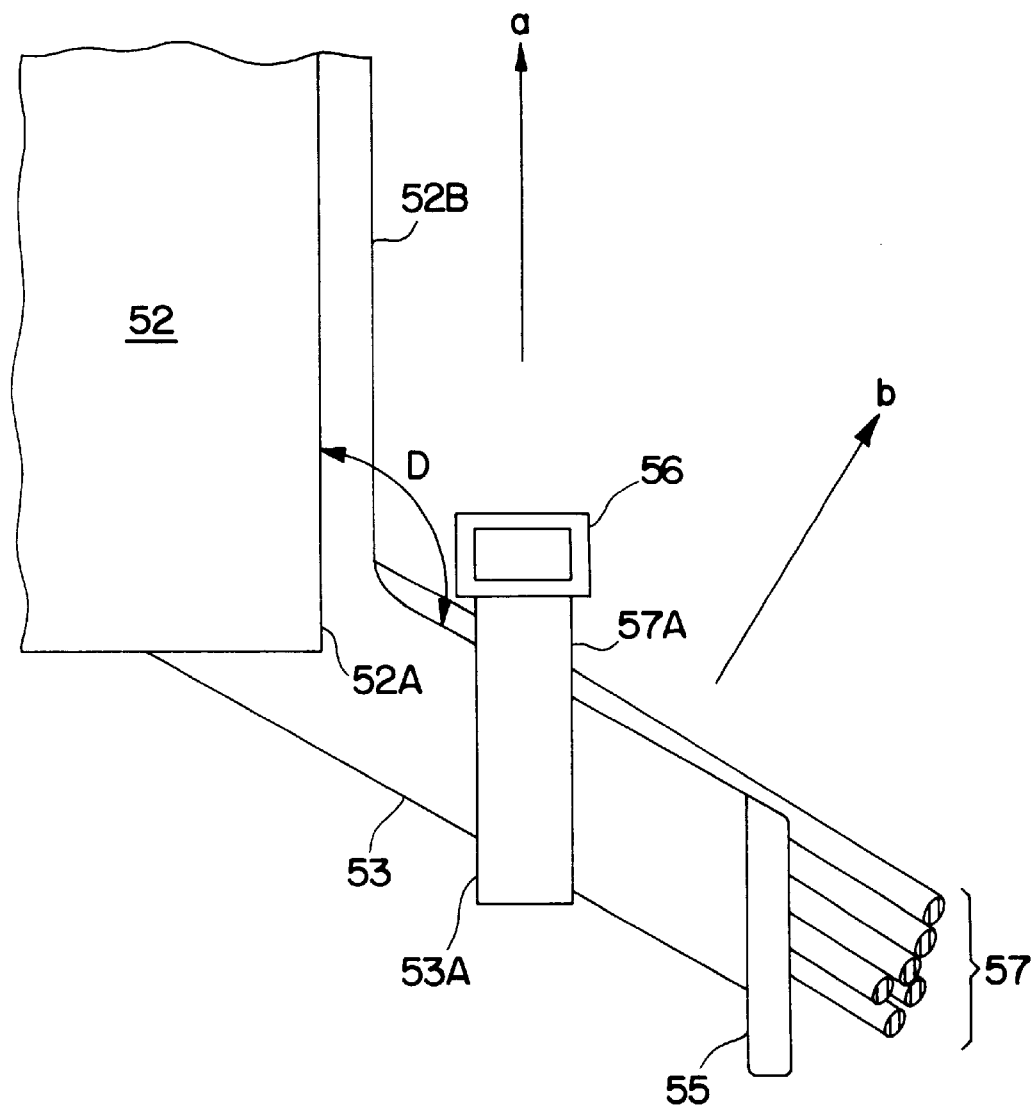
FIG. 6 is a view, similar to that of FIG. 2, of the prior art device of FIG. 5.
Figure 7:
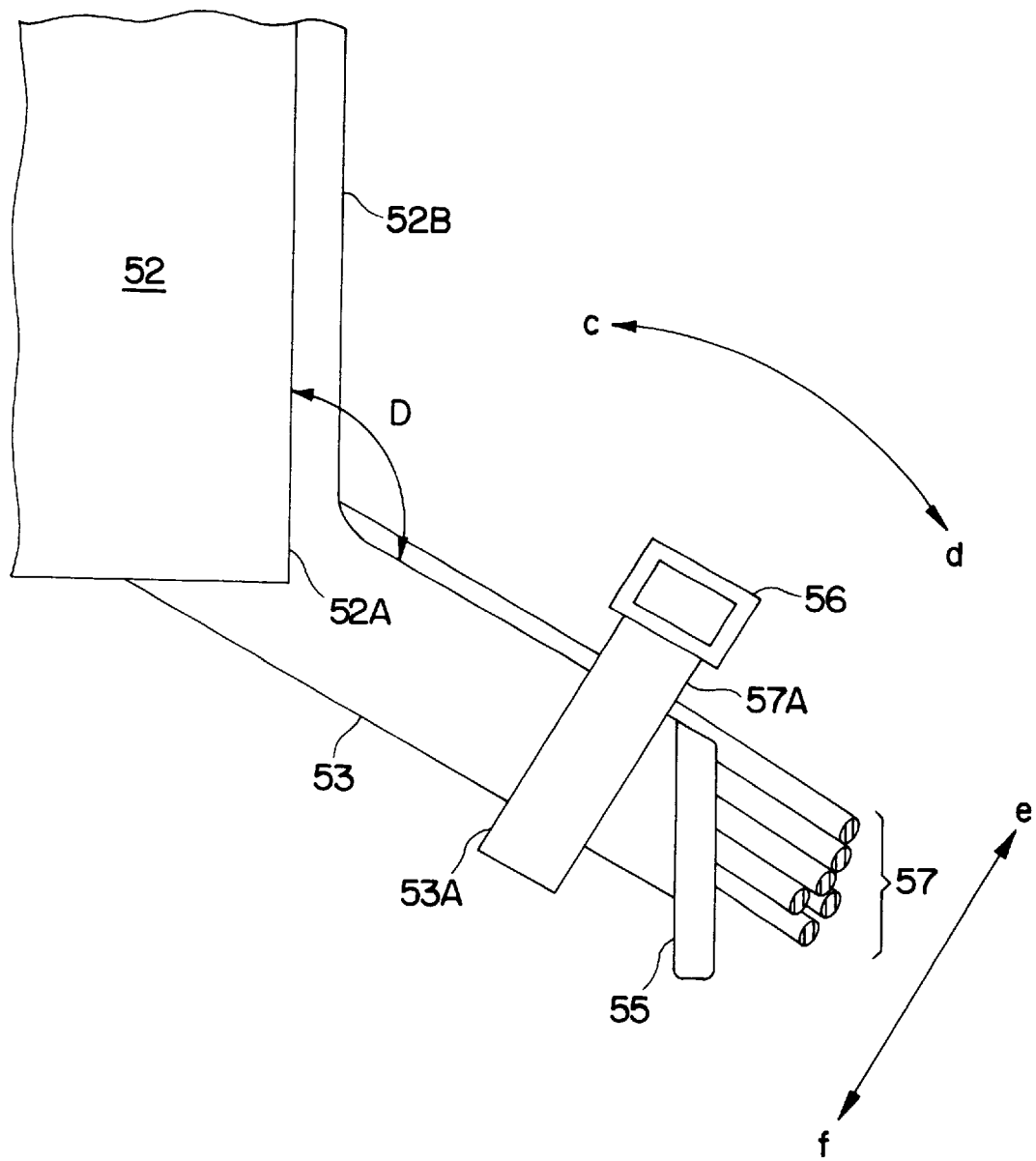
FIG. 7 is a view, similar to that of FIG. 6, showing the tie strap in a different position.

In a modification of the present Invention, as shown in FIG. 4, flange 55 is replaced by a plurality of protuberances 4. The use of these protuberances saves synthetic resin and, therefore, reduces the cost of the connection box. Moreover, since the entire device is injection molded, it would not be a serious problem to switch from the prior art connection box to that of the present Invention.

Although only certain embodiments of the present Invention have been expressly disclosed, it is, nonetheless, to be broadly construed and not to be limited except by the character of the claims appended hereto.

What we claim is:

1. An electrical connection box assembly comprising a body having a front wall, a cover on said body, a projection extending outwardly of said body on said front wall, a projection axis of said projection at a projection angle E to said front wall, said angle E being in a range of more than 0° and less than 180°; said projection comprising a channel, a wire harness in said channel, a cut out in said front wall merging with a proximal end of said projection, a retaining element extending radially outwardly from said projection, parallel to said front wall throughout said range and said retaining element adjacent a distal end of said projection, a tie strap on said projection securing said wire harness, said tie strap having its longitudinal axis parallel to said retaining element, an edge of said tie strap being adjacent said retaining element, whereby said tie strap is secured to said projection.

2. The electrical connection box of claim 1 wherein said projection tapers toward said distal end.

3. The electrical connection box assembly of claim 1 wherein said channel is semi-conical in shape.

4. The electrical connection box assembly of claim 1 wherein said tie strap abuts said retaining element.

5. The electrical connection box assembly of claim 1 wherein said retaining element is a flange.

6. The electrical connection box assembly of claim 1 wherein said retaining element is a plurality of circumferentially spaced apart protuberances.

7. The electrical connection box assembly of claim 1 wherein said angle is greater than 90°.

\* \* \* \* \*